United States Patent
Chen et al.

(10) Patent No.: US 9,906,182 B2
(45) Date of Patent: *Feb. 27, 2018

(54) THREE-PHASE SWITCHED RELUCTANCE MOTOR TORQUE RIPPLE TWO-LEVEL SUPPRESSION METHOD

(71) Applicant: CHINA UNIVERSITY OF MINING AND TECHNOLOGY, Xuzhou, Jiangsu (CN)

(72) Inventors: Hao Chen, Jiangsu (CN); Jiaotong Shi, Jiangsu (CN)

(73) Assignee: CHINA UNIVERSITY OF MINING AND TECHNOLOGY, Xuzhou, Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/308,818

(22) PCT Filed: Aug. 19, 2015

(86) PCT No.: PCT/CN2015/087476
§ 371 (c)(1),
(2) Date: Mar. 27, 2017

(87) PCT Pub. No.: WO2016/029810
PCT Pub. Date: Mar. 3, 2016

(65) Prior Publication Data
US 2017/0222590 A1    Aug. 3, 2017

(30) Foreign Application Priority Data
Aug. 27, 2014  (CN) .......................... 2014 1 0432999

(51) Int. Cl.
*H02P 25/098*   (2016.01)
*H02P 6/10*     (2006.01)

(52) U.S. Cl.
CPC .............. *H02P 25/098* (2016.02); *H02P 6/10* (2013.01)

(58) Field of Classification Search
CPC .......... H02P 6/10; H02P 25/098; H02P 25/08; H02P 2205/05; H02P 25/089; B60L 2220/18
See application file for complete search history.

(56) References Cited

U.S. PATENT DOCUMENTS 5,780,986 A * 7/1998 Shelton .................. G05B 11/28
                                                    318/400.11
5,998,952 A * 12/1999 McLaughlin ......... H02P 25/098
                                                    318/432
(Continued)

FOREIGN PATENT DOCUMENTS

CN          1758528       4/2006
CN        102545743 A     7/2012
(Continued)

OTHER PUBLICATIONS

PCT International Search Report and Written Opinion, PCT/CN2015/087476 dated Nov. 18, 2015 with English translation of International Search Report.

*Primary Examiner* — Bentsu Ro
*Assistant Examiner* — Thai Dinh
(74) *Attorney, Agent, or Firm* — TraskBritt, P.C.

(57) ABSTRACT

A three-phase switched reluctance motor torque ripple two-level suppression method. A first set of torque thresholds at rotor position interval [0°, $\theta_r/3$]. A second set of torque thresholds at rotor position interval [$\theta_r/3$, $\theta_r/2$]. Power is supplied for excitation. The power supplied for excitation to phase A leads the power supplied for excitation to phase B by $\theta_r/3$. Phase A is turned off, while phase B is turned on. An entire commutation process from phase A to phase B is divided. In rotor position interval [0°, $\theta_1$], phase A uses the (Continued)

second set of torque thresholds while phase B uses the first set. Critical position $\theta_1$ automatically appears in the commutation process. Total torque is controlled. In rotor position interval $[\theta_1, \theta_r/3]$, phase A uses the second set of torque thresholds, phase B uses the first set, and the total torque is controlled, suppressing torque ripples of a three-phase switched reluctance motor.

2 Claims, 1 Drawing Sheet

(56) References Cited

U.S. PATENT DOCUMENTS

| | | | | |
|---|---|---|---|---|
| 6,002,226 A * | 12/1999 | Collier-Hallman | ....... | H02P 6/10 318/139 |
| 6,448,724 B1 * | 9/2002 | Kleinau | ................ | B62D 5/046 318/139 |
| 6,559,617 B2 * | 5/2003 | Kim | ...................... | H02P 25/098 318/432 |
| 6,577,087 B2 * | 6/2003 | Su | ........................ | H02M 7/483 318/254.1 |
| 7,129,659 B2 * | 10/2006 | Buma | ................ | B60G 17/0157 180/400 |
| 7,518,330 B2 * | 4/2009 | Lin | .......................... | H02P 6/08 318/434 |
| 7,764,032 B2 * | 7/2010 | Crabill | ..................... | H02P 6/15 318/400.01 |
| 8,080,969 B2 | 12/2011 | Koenig | | |
| 8,544,580 B2 * | 10/2013 | Cheng | ..................... | H02P 25/08 180/65.51 |
| 8,604,726 B2 * | 12/2013 | Hogg | ........................ | H02P 6/18 318/139 |
| 2002/0109476 A1 | 8/2002 | Kim | | |

FOREIGN PATENT DOCUMENTS

| | | |
|---|---|---|
| CN | 201441043299.7 | 8/2014 |
| CN | 104333276 A | 2/2015 |
| WO | 2014063452 A1 | 5/2014 |
| WO | 2014063453 A1 | 5/2014 |
| WO | 2014063454 A1 | 5/2014 |
| WO | 2014114036 A1 | 7/2014 |
| WO | 2014117441 A1 | 8/2014 |
| WO | 2014121557 A1 | 8/2014 |
| WO | 2015024508 A1 | 2/2015 |
| WO | 2015039420 A1 | 3/2015 |
| WO | 2015074370 A1 | 5/2015 |
| WO | 2015078205 A1 | 6/2015 |
| WO | 2015139420 A1 | 9/2015 |
| WO | 2015172455 A1 | 11/2015 |
| WO | 2016029777 A1 | 3/2016 |
| WO | 2016029810 A1 | 3/2016 |
| WO | 2016029815 A1 | 3/2016 |
| WO | 2016029816 A1 | 3/2016 |
| WO | 2016066025 A1 | 5/2016 |
| WO | 2016090956 A1 | 6/2016 |
| WO | 2016091090 A1 | 6/2016 |
| WO | 2016091091 A1 | 6/2016 |
| WO | 2016091092 A1 | 6/2016 |
| WO | 2016095695 A1 | 6/2016 |

* cited by examiner

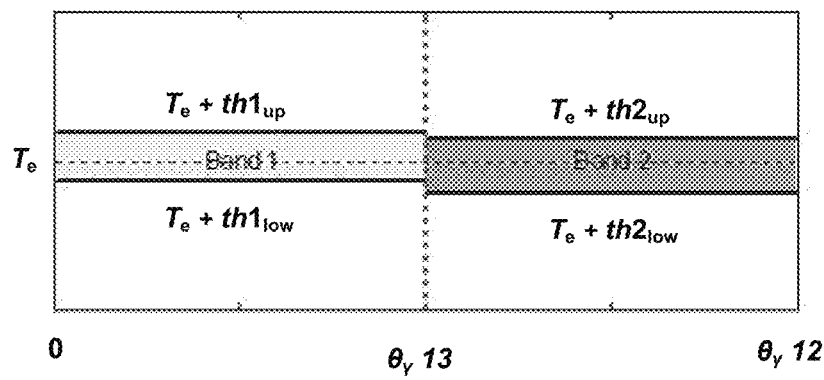
FIG. 1
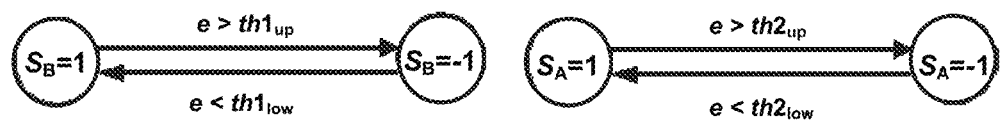
FIG. 2A  FIG 2B
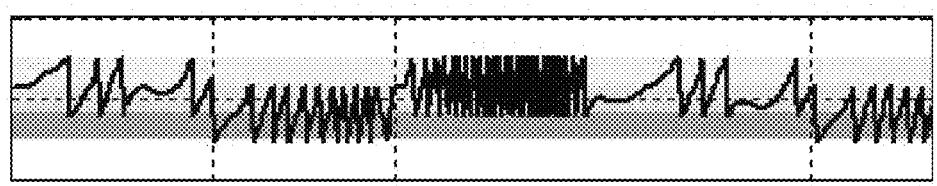
FIG. 3

THREE-PHASE SWITCHED RELUCTANCE MOTOR TORQUE RIPPLE TWO-LEVEL SUPPRESSION METHOD

CROSS-REFERENCE TO RELATED APPLICATIONS

This application is a national phase entry under 35 U.S.C. § 371 of International Patent Application PCT/CN2015/087476, filed Aug. 19, 2015, designating the United States of America and published as International Patent Publication WO 2016/029810 A1 on Mar. 3, 2016, which claims the benefit under Article 8 of the Patent Cooperation Treaty to Chinese Patent Application Serial No. 201410432999.7, filed Aug. 27, 2014.

TECHNICAL FIELD

This disclosure relates to a method for two-level suppression of torque ripple of a switched reluctance motor, and is particularly applicable to a three-phase switched reluctance motor drive system.

BACKGROUND

When conventional direct torque control of a switched reluctance motor is used to eliminate torque ripple, the main switch turn-off angle of the power converter needs to be set. Different main switch turn-off angles of the power converter have an important influence on torque control performance. In order to smoothly output torque, the turn-off angle needs to be determined through offline calculation(s) or online regulation(s). In order to generate maximum smooth torque, exciting current needs to be established quickly. Therefore, once entering conduction interval, current should increase at a maximum rate. In order to avoid generation of negative torque, current should decrease at a maximum rate and the main switch turn-off angle of the power converter should be in an appropriate position: when it is at the front, current cannot increase to a certain level and torque is lower than the expected value; and when it is at the back, current enters a region of negative torque. The requirements are rigorous.

BRIEF SUMMARY

Provided is a method for two-level suppression of torque ripple of a three-phase switched reluctance motor. Described are methods for suppressing torque ripple of a switched reluctance motor, which methods realize output torque smooth control in a maximum range without taking into consideration the influence of the main switch turn-off angle of the power converter on the torque control performance.

Technical scheme: This disclosure provides:

A method for two-level suppression of torque ripple of a three-phase switched reluctance motor, comprising the following steps:

a. Setting the first group of torque thresholds ($th1_{low}$, $th1_{up}$) in rotor position interval [0°, $\theta_r/3$], and the second group of torque thresholds ($th2_{low}$, $th2_{up}$) in rotor position interval [$\theta_r/3$, $\theta_r/2$], wherein these four torque thresholds meet the following conditions:

$$th1_{up} > th2_{up} > 0 \quad (1)$$

$$th2_{low} < th1_{low} < 0 \quad (2)$$

$$|th1_{up}| = |th2_{low}| \quad (3)$$

$$|th2_{up}| = |th1_{low}| \quad (4)$$

wherein, rotor position 0° is minimum phase inductance position, rotor position $\theta_r$ is angular pitch, i.e., one rotor cycle, and a half rotor cycle is $\theta_r/2$;

b. Setting excited state $S_A$ as excited state of phase A power supply, wherein excited state $S_A=1$ means the exciting voltage of phase A power supply is positive and excited state $S_A=-1$ means the exciting voltage of phase A power supply is negative; setting excited state $S_B$ as excited state of phase B power supply, wherein excited state $S_B=1$ means the exciting voltage of phase B power supply is positive and excited state $S_B=-1$ means the exciting voltage of phase B power supply is negative, and the expected total smooth torque is $T_e$;

c. For adjacent phase A and phase B power supply excitations, phase A power supply excitation is $\theta_r/3$ ahead of phase B power supply excitation. At this moment, phase A is turn off, phase B is turn on, and two-level suppression of torque ripple of three-phase switched reluctance motor is realized by the two-interval commutation process from phase A to phase B.

2. The method for two-level suppression of torque ripple of three-phase switched reluctance motor according to the method outlined above, wherein the two-interval commutation process from phase A to phase B is as follows:

(1) In rotor position interval [0°, $\theta_1$], phase A uses the second group of torque thresholds ($th2_{low}$, $th2_{up}$), phase B uses the first group of torque thresholds ($th1_{low}$, $th1_{up}$), critical position $\theta_1$ appears automatically in the commutation process, and no extra calculation is needed;

(1.1) Phase B conduction cycle is entered in rotor position 0°, initial excited state $S_B=1$ is set, and phase B current and torque increase from 0; excited state $S_A$ maintains original state $S_A=-1$, and phase A current and torque decrease; as the inductance change rate and current of phase B in this position are relatively small, the increase rate of phase B torque is smaller than the decrease rate of phase A torque and total torque decreases along with phase A;

(1.2) When total torque first reaches torque value $T_e+th1_{low}$, phase A and phase B state transfer conditions are not met, excited states $S_A$ and $S_B$ maintain original states and total torque continues to decrease;

(1.3) When total torque decreases to torque value $T_e+th2_{low}$, phase A state transfer conditions are met, excited state $S_A$ is switched from $-1$ to 1 and phase A torque increases; phase B maintains original state and phase B torque continues to increase, thereby total torque increases;

(1.4) When total torque increases to torque value $T_e+th1_{low}$, phase A and phase B state transfer conditions are not met, excited states $S_A$ and $S_B$ maintain original states and total torque continues to increase;

(1.5) When total torque increases to torque value $T_e+th2_{up}$, phase A state transfer conditions are met, excited state $S_A$ is switched from 1 to $-1$ and phase A torque decreases; but phase B state transfer conditions are not met, excited state $S_B$ maintains original state and total torque begins to decrease;

(1.6) Steps (1.2)~(1.5) are repeated, excited state $S_B$ maintains state 1 all the time, i.e., phase B is excited by positive voltage, and the current and torque of phase B increase at a maximum rate; excited state $S_A$ is switched between $-1$ and 1 and total torque is controlled in [$T_e+th2_{low}$, $T_e+th2_{up}$] all the time, thereby inhibiting ripple of three-phase switched reluctance motor torque in rotor position interval $[0°, \theta_1]$;

(2) In rotor position interval $[\theta_1, \theta_r/3]$, phase A continues to use the second group of torque thresholds ($th2_{low}$, $th2_{up}$) and phase B continues to use the first group of torque thresholds ($th1_{low}$, $th1_{up}$);

(2.1) In rotor position $\theta_1$, the inductance change rate and phase current of phase B have reached a certain level. When excited state $S_B=1$ and excited state $S_A=-1$, the increase rate of phase B torque is no longer smaller than the decrease rate of phase A torque, the change trend of total torque is decided by phase B and total torque increases;

(2.2) When total torque increases to torque value $T_e+th1_{up}$, phase B state transfer conditions are met, excited state $S_B$ is converted from 1 to $-1$ and phase B torque decreases; excited state $S_A$ maintains state $-1$ and total torque decreases;

(2.3) When total torque first decreases to torque value $T_e+th2_{up}$, phase A and phase B state transfer conditions are not met, excited states $S_A$ and $S_B$ maintain original states and total torque continues to decrease;

(2.4) When total torque decreases to torque value $T_e+th1_{row}$, phase B state transfer conditions are met, excited state $S_B$ is converted from $-1$ to 1 and phase B torque increases; excited state $S_A$ maintains state $-1$ and total torque increases along with phase B torque;

(2.5) When total torque increases to torque value $T_e+th2_{up}$, phase A and phase B state transfer conditions are not met, excited states $S_A$ and $S_B$ maintain original states and total torque continues to increase;

(2.6) When total torque increases to torque value $T_e+th1_{up}$, steps (2.2)~(2.5) are repeated, excited state $S_A$ maintains state $-1$, excited state $S_B$ is switched between $-1$ and 1 and total torque is controlled in $[T_e+th1_{row}, T_e+th1_{up}]$, thereby inhibiting ripple of three-phase switched reluctance motor torque in rotor position interval $[\theta_1, \theta_r/3]$.

Beneficiary effect: Due to adoption of the foregoing two-level suppression method, by setting two groups of torque thresholds and excited states of adjacent phase A and phase B, without considering the influence of different main switch turn-off angles of the power converter on torque control performance and determining turn-off angles through offline calculation or online regulation, this disclosure makes phase A and phase B switch between two excited states in which power supply exciting voltage is positive and negative, respectively, controls total torque between the two groups of torque thresholds, smoothly controls transient torque of three-phase switched reluctance motor and suppresses ripple of three-phase switched reluctance motor torque. The actual waveform of the exciting voltage of the motor winding and the expected voltage waveform have the same features. The actual waveform of phase current is highly identical to the expected waveform of phase current. This disclosure has high practicability, applies to various types of three-phase switched reluctance motor drive systems with various structures and does not need extra calculation. In rotor position interval $[\theta_1, \theta_r/3]$, phase A uses the second group of torque thresholds ($th2_{low}$, $th2_{up}$), phase B uses the first group of torque thresholds ($th1_{low}$, $th1_{up}$) and total torque is controlled in $[T_e+th2_{low}, T_e+th2_{up}]$ and $[T_e+th1_{low}, T_e+th1_{up}]$. This disclosure suppresses torque ripple of three-phase switched reluctance motor and has a broad application prospect.

BRIEF DESCRIPTION OF THE DRAWINGS

FIG. 1 is a schematic diagram for setting of two-level torque thresholds of switched reluctance motor provided by this disclosure;

FIG. 2A is a schematic diagram for conversion of excited state of phase B power supply of switched reluctance motor provided by this disclosure;

FIG. 2B is a schematic diagram for conversion of excited state of phase A power supply of switched reluctance motor provided by this disclosure; and FIG. 3 is torque waveform of switched reluctance motor provided by this disclosure.

DETAILED DESCRIPTION

This disclosure is further described below in connection with the examples shown in the accompanying drawings:

a. As shown in FIG. 1, for one three-phase switched reluctance motor, setting the first group of torque thresholds ($th1_{low}$, $th1_{up}$) in rotor position interval $[0°, \theta_r/3]$, and the second group of torque thresholds ($th2_{low}$, $th2_{up}$) in rotor position interval $[\theta_r/3, \theta_r/2]$, wherein these four torque thresholds meet the following conditions:

$$th1_{up} > th2_{up} > 0 \qquad (1)$$

$$th2_{low} < th1_{low} < 0 \qquad (2)$$

$$|th1_{up}| = |th2_{low}| \qquad (3)$$

$$|th2_{up}| = |th1_{low}| \qquad (4)$$

wherein, rotor position $0°$ is minimum phase inductance position, rotor position $\theta_r$ is angular pitch, i.e., one rotor cycle, and a half rotor cycle is $\theta_r/2$;

b. As shown in FIGS. 2A and 2B, setting excited state $S_A$ as excited state of phase A power supply, wherein excited state $S_A=1$ means the exciting voltage of phase A power supply is positive and excited state $S_A=-1$ means the exciting voltage of phase A power supply is negative; setting excited state $S_B$ as excited state of phase B power supply, wherein excited state $S_B=1$ means the exciting voltage of phase B power supply is positive and excited state $S_B=-1$ means the exciting voltage of phase B power supply is negative, and the expected total smooth torque is $T_e$;

c. For adjacent phase A and phase B power supply excitations, phase A power supply excitation is $\theta_r/3$ ahead of phase B power supply excitation. At this moment, phase A is turn off and phase B is turn on. As shown in FIG. 1, the commutation process from phase A to phase B is divided into two intervals:

(1) In rotor position interval $[0°, \theta_1]$, phase A uses the second group of torque thresholds ($th2_{low}$, $th2_{up}$), phase B uses the first group of torque thresholds ($th1_{low}$, $th1_{up}$), critical position $\theta_1$ appears automatically in the commutation process, and no extra calculation is needed;

(1.1) Phase B conduction cycle is entered in rotor position $0°$, initial excited state $S_B=1$ is set, and phase B current and torque increase from 0; excited state $S_A$ maintains original state $S_A=-1$, and phase A current and torque decrease; as the inductance change rate and current of phase B in this position are relatively small, the increase rate of phase B torque is smaller than the decrease rate of phase A torque and total torque decreases along with phase A;

(1.2) When total torque first reaches torque value $T_e+th1_{low}$, phase A and phase B state transfer conditions are not met, excited states $S_A$ and $S_B$ maintain original states and total torque continues to decrease;

(1.3) When total torque decreases to torque value $T_e+th2_{low}$, phase A state transfer conditions are met, excited state $S_A$ is switched from −1 to 1 and phase A torque increases; phase B maintains original state and phase B torque continues to increase, thereby total torque increases;

(1.4) When total torque increases to torque value $T_e+th1_{low}$, phase A and phase B state transfer conditions are not met, excited states $S_A$ and $S_B$ maintain original states and total torque continues to increase;

(1.5) When total torque increases to torque value $T_e+th2_{up}$, phase A state transfer conditions are met, excited state $S_A$ is switched from 1 to −1 and phase A torque decreases; but phase B state transfer conditions are not met, excited state $S_B$ maintains original state and total torque begins to decrease;

(1.6) Steps (1.2)~(1.5) are repeated, excited state $S_B$ maintains state 1 all the time, i.e., phase B is excited by positive voltage, and the current and torque of phase B increase at a maximum rate; excited state $S_A$ is switched between −1 and 1 and total torque is controlled in $[T_e+th2_{low}, T_e+th2_{up}]$ all the time, thereby inhibiting ripple of three-phase switched reluctance motor torque in rotor position interval $[0°, \theta_1]$;

(2) In rotor position interval $[\theta_1, \theta_r/3]$, phase A continues to use the second group of torque thresholds ($th2_{low}$, $th2_{up}$) and phase B continues to use the first group of torque thresholds ($th1_{low}$, $th1_{up}$);

(2.1) In rotor position $\theta_1$, the inductance change rate and phase current of phase B have reached a certain level. When excited state $S_B=1$ and excited state $S_A=-1$, the increase rate of phase B torque is no longer smaller than the decrease rate of phase A torque, the change trend of total torque is decided by phase B and total torque increases;

(2.2) When total torque increases to torque value $T_e+th1_{up}$, phase B state transfer conditions are met, excited state $S_B$ is converted from 1 to −1 and phase B torque decreases; excited state $S_A$ maintains state −1 and total torque decreases;

(2.3) When total torque first decreases to torque value $T_e+th2_{up}$, phase A and phase B state transfer conditions are not met, excited states $S_A$ and $S_B$ maintain original states and total torque continues to decrease;

(2.4) When total torque decreases to torque value $T_e+th1_{low}$, phase B state transfer conditions are met, excited state $S_B$ is converted from −1 to 1 and phase B torque increases; excited state $S_A$ maintains state −1 and total torque increases along with phase B torque;

(2.5) When total torque increases to torque value $T_e+th2_{up}$, phase A and phase B state transfer conditions are not met, excited states $S_A$ and $S_B$ maintain original states and total torque continues to increase;

(2.6) When total torque increases to torque value $T_e+th1_{up}$, Steps (2.2)~(2.5) are repeated, excited state $S_A$ maintains state −1, excited state $S_B$ is switched between −1 and 1 and total torque is controlled in $[T_e+th1_{low}, T_e+th1_{up}]$, thereby inhibiting ripple of three-phase switched reluctance motor torque in rotor position interval $[\theta_1, \theta_r/3]$.

For adjacent phase B and phase C power supply excitations, when phase B power supply excitation is $\theta_r/3$ ahead of phase C power supply excitation, torque threshold setting, commutation process, and phase B and phase C excited state switching and transfer methods are similar to the foregoing circumstance. For adjacent phase C and phase A power supply excitations, when phase C power supply excitation is $\theta_r/3$ ahead of phase A power supply excitation, torque threshold setting, commutation process, and phase C and phase A excited state switching and transfer methods are similar to the foregoing circumstance. The acquired switched reluctance motor torque waveform is as shown in FIG. 3.

The invention claimed is:

1. A method for two-level suppression of torque ripple of a three-phase switched reluctance motor, wherein, the method comprises following steps:
   a. setting a first group of torque thresholds ($th1_{low}$, $th1_{up}$) in rotor position interval $[0°, \theta_r/3]$, and a second group of torque thresholds ($th2_{low}$, $th2_{up}$) in rotor position interval $[\theta_r/3, \theta_r/2]$, wherein these four torque thresholds meet the following conditions:

$$th1_{up} > th2_{up} > 0 \qquad (1)$$

$$th2_{low} < th1_{low} < 0 \qquad (2)$$

$$|th1_{up}| = |th2_{low}| \qquad (3)$$

$$|th2_{up}| = |th1_{low}| \qquad (4)$$

wherein, rotor position 0° is minimum phase inductance position, rotor position $\theta_r$ is angular pitch; and
   b. setting excited state $S_A$ as excited state of phase A power supply, wherein excited state $S_A=1$ means an exciting voltage of phase A power supply is positive and excited state $S_A=-1$ means the exciting voltage of phase A power supply is negative; setting excited state $S_B$ as excited state of phase B power supply, wherein excited state $S_B=1$ means an exciting voltage of phase B power supply is positive and excited state $S_B=-1$ means the exciting voltage of phase B power supply is negative, and an expected total smooth torque is $T_e$;
   c. for adjacent phase A and phase B power supply excitations, phase A power supply excitation is $\theta_r/3$ ahead of phase B power supply excitation; at this moment, phase A is turn off, phase B is turn on, and two-level suppression of torque ripple of three-phase switched reluctance motor is realized by a two-interval commutation process from phase A to phase B.

2. The method according to claim 1, wherein the two-interval commutation process from phase A to phase B is as follows:
   (1) in rotor position interval $[0°, \theta_1]$, phase A uses the second group of torque thresholds ($th2_{low}$, $th2_{up}$), phase B uses the first group of torque thresholds ($th1_{low}$, $th1_{up}$), critical position $\theta_1$ appears automatically in the commutation process, and no extra calculation is needed;
      (1.1) phase B conduction cycle is entered in rotor position 0°, initial excited state $S_B=1$ is set, and phase B current and torque increase from 0; excited state $S_A$ maintains original state $S_A=-1$, and phase A current and torque decrease; as inductance change rate and current of phase B in this position are relatively small, an increase rate of phase B torque is smaller than a decrease rate of phase A torque and total torque decreases along with phase A;

(1.2) when total torque first reaches torque value $T_e+th1_{low}$, phase A and phase B state transfer conditions are not met, excited states $S_A$ and $S_B$ maintain original states and total torque continues to decrease;

(1.3) when total torque decreases to torque value $T_e+th2_{low}$, phase A state transfer conditions are met, excited state $S_A$ is switched from −1 to 1 and phase A torque increases; phase B maintains original state and phase B torque continues to increase, thereby total torque increases;

(1.4) when total torque increases to torque value $T_e+th1_{low}$, phase A and phase B state transfer conditions are not met, excited states $S_A$ and $S_B$ maintain original states and total torque continues to increase;

(1.5) when total torque increases to torque value $T_e+th2_{up}$, phase A state transfer conditions are met, excited state $S_A$ is switched from 1 to −1 and phase A torque decreases; but phase B state transfer conditions are not met, excited state $S_B$ maintains original state and total torque begins to decrease;

(1.6) steps (1.2)~(1.5) are repeated, excited state $S_B$ maintains state 1 all the time;

(2) in rotor position interval $[\theta_1, \theta_r/3]$, phase A continues to use the second group of torque thresholds ($th2_{low}$, $th2_{up}$) and phase B continues to use the first group of torque thresholds ($th1_{low}$, $th1_{up}$);

(2.1) in rotor position $\theta_1$, the inductance change rate and current of phase B have reached a certain level; when excited state $S_B=1$ and excited state $S_A=-1$, the increase rate of phase B torque is no longer smaller than the decrease rate of phase A torque, change trend of total torque is decided by phase B and total torque increases;

(2.2) when total torque increases to torque value $T_e+th1_{up}$, phase B state transfer conditions are met, excited state $S_B$ is converted from 1 to −1 and phase B torque decreases; excited state $S_A$ maintains state −1 and total torque decreases;

(2.3) when total torque first decreases to torque value $T_e+th2_{up}$, phase A and phase B state transfer conditions are not met, excited states $S_A$ and $S_B$ maintain original states and total torque continues to decrease;

(2.4) when total torque decreases to torque value $T_e+th1_{low}$, phase B state transfer conditions are met, excited state $S_B$ is converted from −1 to 1 and phase B torque increases; excited state $S_A$ maintains state −1 and total torque increases along with phase B torque;

(2.5) when total torque increases to torque value $T_e+th2_{up}$, phase A and phase B state transfer conditions are not met, excited states $S_A$ and $S_B$ maintain original states and total torque continues to increase; and (2.6) when total torque increases to torque value $T_e+th1_{up}$, steps (2.2)~(2.5) are repeated, excited state $S_A$ maintains state −1, excited state $S_B$ is switched between −1 and 1 and total torque is controlled in $[T_e+th1_{low}, T_e+th1_{up}]$, thereby inhibiting ripple of three-phase switched reluctance motor torque in rotor position interval $[\theta_1, \theta_r/3]$.

* * * * *